(12) United States Patent
Schlange et al.

(10) Patent No.: US 10,807,791 B2
(45) Date of Patent: Oct. 20, 2020

(54) NUT BUTTER SPREAD WITH SLICED NUTS AND PROCESS FOR MAKING THE SAME

(71) Applicant: ConAgra Foods RDM, Inc., Omaha, NE (US)

(72) Inventors: Ashlee Schlange, Omaha, NE (US); Cara Tabor, Omaha, NE (US); Rodney Green, Omaha, NE (US); Travis Campbell, Omaha, NE (US)

(73) Assignee: Conagra Foods RDM, Inc., Omaha, NE (US)

( * ) Notice: Subject to any disclaimer, the term of this patent is extended or adjusted under 35 U.S.C. 154(b) by 1100 days.

(21) Appl. No.: 15/063,741

(22) Filed: Mar. 8, 2016

(65) Prior Publication Data

US 2016/0353781 A1 Dec. 8, 2016

Related U.S. Application Data

(60) Provisional application No. 62/166,980, filed on May 27, 2015.

(51) Int. Cl.
| | | |
|---|---|---|
| *A23L 1/38* | (2006.01) | |
| *B65D 85/72* | (2006.01) | |
| *A23D 7/04* | (2006.01) | |
| *A23D 7/005* | (2006.01) | |

(52) U.S. Cl.
CPC ............ *B65D 85/72* (2013.01); *A23D 7/0056* (2013.01); *A23D 7/04* (2013.01)

(58) Field of Classification Search
CPC ......... A23D 7/0056; A23D 7/04; B65D 85/72
USPC ...................................................... 426/633
See application file for complete search history.

(56) References Cited

U.S. PATENT DOCUMENTS

| | | | | |
|---|---|---|---|---|
| 2,780,549 A | * | 2/1957 | Lea Bloch | A23L 25/30 426/658 |
| 3,069,273 A | * | 12/1962 | Wayne | B65B 9/04 220/266 |
| 3,216,830 A | * | 11/1965 | Melnick | A23L 25/10 426/633 |
| 3,317,325 A | * | 5/1967 | Durst | A23L 25/30 426/627 |
| 3,798,335 A | * | 3/1974 | Peters et al. | A01J 21/00 426/414 |
| 3,857,310 A | * | 12/1974 | Tiby | B26D 1/25 209/638 |
| 3,950,568 A | * | 4/1976 | Parker | A23L 25/10 426/633 |
| 4,604,925 A | * | 8/1986 | Wisdom | B26D 1/03 144/162.1 |
| 2004/0081744 A1 | * | 4/2004 | Liu | A23L 25/10 426/633 |
| 2006/0045938 A1 | * | 3/2006 | Slesinski | A23G 3/48 426/93 |
| 2011/0135932 A1 | * | 6/2011 | Mester | C01B 19/02 428/402 |

OTHER PUBLICATIONS

Wei et al. CN 202781244 ( Mar. 2013).*
NPL Mesh size retrieved from internet Sep. 2018. (Year: 2018).*
NPL "Extra Light Honey" (Year: 1985).*

* cited by examiner

*Primary Examiner* — Erik Kashnikow
*Assistant Examiner* — Bhaskar Mukhopadhyay
(74) *Attorney, Agent, or Firm* — Ryan T. Grace; Advent, LLP

(57) ABSTRACT

A nut butter spread is described to include nut portions blended in a nut butter base. The nut portions are derived from nuts having been finished (e.g., prior to introduction to the nut butter base) via a slicing operation.

32 Claims, 5 Drawing Sheets

NUT BUTTER SPREAD WITH SLICED NUTS AND PROCESS FOR MAKING THE SAME

CROSS-REFERENCE TO RELATED APPLICATIONS

The present application claims the benefit under 35 U.S.C. § 119(e) of U.S. Provisional Application Ser. No. 62/166,980, entitled GRANULAR NUT BUTTER FOOD PRODUCT, filed May 27, 2015. U.S. Provisional Application Ser. No. 62/166,980 is hereby incorporated by reference in its entirety.

BACKGROUND

Peanut butter and other nut butter spreads are very popular to consumers. In particular, consumers desire a variety of flavors and textures associated with nut butter spreads. For example, sweetened styles of nut butter spreads can include honey-flavored variants, whereas textured styles of nut butter spreads can include creamy variants and crunchy variants.

SUMMARY

This Summary is provided to introduce a selection of concepts in a simplified form that are further described below in the Detailed Description. This Summary is not intended to identify key and/or essential features of the claimed subject matter. Also, this Summary is not intended to limit the scope of the claimed subject matter in any manner.

Aspects of the disclosure pertain to a nut butter spread with sliced nuts and a process for making the same. In an embodiment, a nut butter spread with sliced nuts includes a nut butter base with sliced nuts. The nut butter base can include a nut paste, a sweetening agent, shortening, salt, and vegetable oil. The nut butter spread with sliced nuts also includes a plurality of sliced nuts.

In an embodiment, a method for producing a nut butter spread with sliced nuts includes forming a nut butter base. The method also includes centrifugally slicing a plurality of nuts in a slicer to produce sliced nuts. The method further includes combining the sliced nuts and the nut butter base. The method further includes blending the sliced nuts and the nut butter base to form a nut butter spread with sliced nuts.

DRAWINGS

The detailed description is described with reference to the accompanying figures.

DETAILED DESCRIPTION

Figure 1:
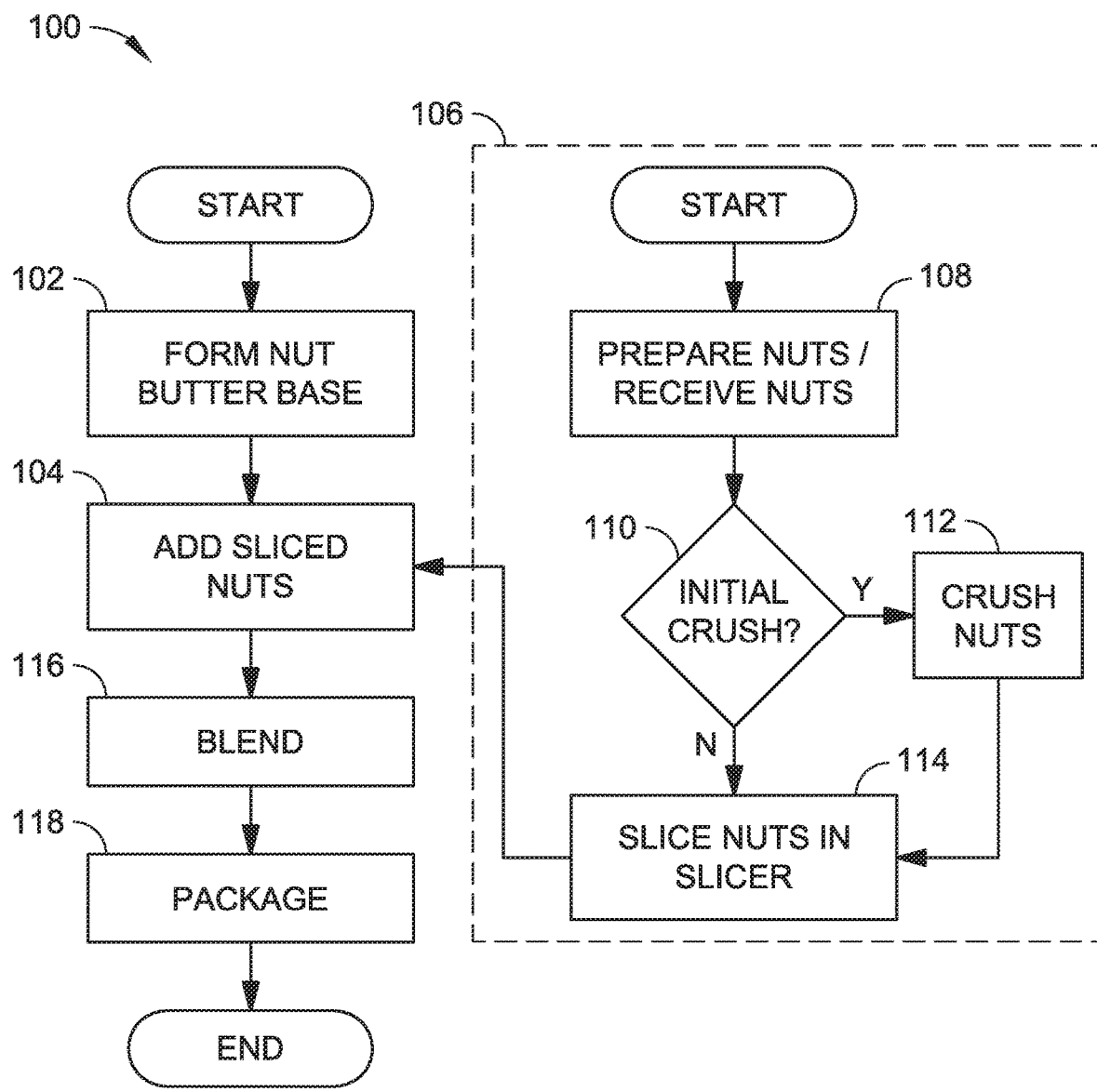
FIG. 1 is a flow diagram illustrating a method for producing a nut butter spread with sliced nuts in accordance with example implementations of the present disclosure.

Features of the detailed description can be embodied in many different forms and should not be construed as limited to the combinations set forth herein; rather, these combinations are provided so that this disclosure will be thorough and complete, and will fully convey the scope. Among other things, the features of the disclosure can be embodied as formulations and food products. The following detailed description is, therefore, not to be taken in a limiting sense.

Food products can include granular additives in a food base for a variety of reasons. For example, granular additives can be utilized to import certain desired organoleptic properties to the food base. Such organoleptic properties can include a desired taste, texture, and mouth-feel. A diverse assortment of food products can be obtained by varying the characteristics of the food base, of the granular additives, or a combination of the food base and the granular additives. For example, a diverse assortment of nut butter spreads can be achieved by varying the characteristics of the nut butter base, the characteristics of additive nuts, or a combination of the nut butter base and the additive nuts.

Various types of foods can include granular additives. For example, foods that utilize granular additives can include yogurt products, ice cream products, nut butter products, beverages, dipping products, sauce products, seasoning products, meat products, and/or the like. Furthermore, such foods can have several forms and packaging regimes. For example, such foods can include individual snack portions, bulk portions, commercial-sized portions, household consumer-sized portions, and the like.

An exemplary food product having a granular additive includes a nut butter spread having granular additives in the form of granular nuts, which can be added for texture and/or organoleptic properties. Typical textured nut butter spreads include added granular nuts granules having a characteristic length from about ⅛ in. to about ⅜ in. The granular nuts are can be produced by processing shelled peanuts (e.g., peanut splits) via roller mill devices that crush the shelled peanuts between a roller and a surface, between two rollers, or the like, where spacing between the roller and surface or between the two rollers dictates the sizing of the resultant granules. These textured nut butter spreads can have a texture and/or mouthfeel that can be unnatural or off-putting to some consumers. Additionally, the spreadability of such textured nut butter spreads (e.g., crunchy nut butter spreads) is significantly affected by the granular additive, where the spreadability can be significantly increased as compared to the spreadability of a creamy or non-granular additive nut butter spread. In some instances, the desired texture of the crunchy nut additive is more than offset for a consumer by the difficulty is spreading or applying the textured nut butter spread to a food item, such as bread, a cracker, a fruit, a vegetable, or the like. Further, it has been found that attempting to reduce the particle size of the nut additives to attempt a more natural texture using roller mill devices is problematic. The particle size of the crushed nuts can be controlled by controlling the spacing between adjacent rollers or between a roller and another surface and/or by controlling a surface texture (e.g., a corrugation size, type, pattern, etc.) of one or more rollers. For instance, to achieve a smaller particle size, the spacing between adjacent rollers or between a roller and another surface can be reduced. However such smaller spacing eventually reaches a point where, rather than crushing the nut, the pressure between adjacent rollers or between a roller and another surface causes release of the oil in the nuts, which has been found to clog roller mill devices. When the roller mill devices of a nut butter spread production process clog, the productivity of the system can suffer due to process downtime via maintenance and cleaning of the clogged roller mill devices.

Nut butter spreads having unique combinations of features are provided herein. For example, peanut butter spreads with sliced peanuts blended in a peanut butter base are described, where the peanut butter spreads with sliced peanuts have a natural mouthfeel and texture, and where even though the total surface area of the nut additives (e.g., for texture) is increased as compared to a crunchy peanut butter spread, surprisingly the spreadability of the peanut butter spread with sliced nuts remains close to the spreadability of the nut butter base or a creamy peanut butter having no nuts added for texture. For example, a peanut butter spread can include additive peanuts that have been derived from a slicing process prior to introduction to the nut butter base, as opposed to a grinding, crushing, or milling process as the finishing step for texture. The sliced nuts are obtained through centrifugally slicing the nuts with a centrifugal slicer, which can obtain sliced nuts having a characteristic length from about 1 mm to about 2 mm without release of substantial amounts of nut oil that can clog processing components and reduce process throughput. The sliced peanuts can be added to and/or blended with a peanut butter base to provide a peanut butter product having desirable organoleptic properties, such as those associated with peanut granules derived from sliced peanuts (e.g., roasted peanuts).

Aspects of the disclosure pertaining to nut butter spreads with sliced nuts are provided below. Example formulations of peanut butter spreads having sliced peanuts blended in a peanut butter base are also provided herein. While particular examples herein are directed to nut butter spreads derived from peanuts, it is noted that other nuts and/or seeds can be utilized to produce the nut butter spreads generally described herein, including but not limited to, almonds, cashews, hazelnuts, macadamias, pecans, pistachios, pumpkin seeds, sesame seeds, soybeans, sunflower seeds, walnuts, and the like.

I. Ingredients of the Nut Butter Spread with Sliced Nuts

The peanut butter spread with sliced peanuts includes several ingredients. These ingredients can have a synergistic effect on the formulation as a whole. For example, the sliced peanuts can impart organoleptic properties associated with an intermediate crunchy texture (e.g., as compared to a creamy-textured or crunchy-textured peanut butter spread) while also maintaining properties suitable for industrial processing. In general, the peanut butter spread with sliced peanuts includes a peanut butter base (including several ingredients) and sliced peanuts, as described further herein. The peanut butter spread with sliced peanuts can also include additional ingredients, including, but not limited to, additives to maintain shelf life, and the like.

1. Peanut Butter Base

The peanut butter base can include a peanut paste, sugar, shortening, salt, and vegetable oil. In various aspects, the peanut butter base can also include additional sweeteners and/or flavoring agents including, but not limited to, honey and molasses. The peanut butter base is generally smooth and has a creamy consistency throughout the peanut butter base, such as by including substantially no granule portions.

A. Peanut Paste

The peanut paste includes shelled peanut kernels ground and blended together. For example, peanuts can be loaded into a grinding system (e.g., Bauer mill, Urschel Comitrol grinder, etc.) and subsequently blended with a mixing screw auger. The peanut paste can include peanuts having differing characteristics including, but not limited to, size, roasting characteristics, and the like. For example, the peanut paste can include ground runner peanuts, where the peanuts have a size corresponding to one or more of split peanuts ("splits") (e.g., separated cotyledon of a peanut kernel, minimum screen size of $17/64"$), medium peanuts ("mediums") (e.g., 40-50 count per ounce, $18/64 \times 3/4"$ slot size (up to 5% fall through)), and jumbo peanuts ("jumbo") (e.g., 38-42 count per ounce, $21/64 \times 3/4"$ slot size (up to 5% fall through)). While the above examples are provided with respect to runner peanuts, other peanuts can be utilized, where such peanuts include, but are not limited to, Spanish peanuts, Tennessee peanuts, Virginia peanuts, Valencia peanuts, and the like. In one aspect, the peanuts are prepared for grinding by roasting the peanut, prior to or after shelling, blanching the roasted and shelled peanut kernel to remove skins/nubs, and in the case of split peanuts, the blanched kernels are split into halves.

In one aspect, the peanut paste includes a weight ratio of splits to mediums from about 90 to about 70 splits to about 30 to about 10 mediums (e.g., 90-70 splits:30-10 mediums). In another aspect, the weight ratio of splits to mediums can be from about 60 to about 100 splits to about 40 to about 0 mediums. For example, the weight ratio of splits to mediums can be from about 60, 62, 64, 66, 68, 70, 72, 74, 76, 78, 80, 82, 84, 86, 88, 90, 92, 94, 96, 98, and 100 splits to about 40, 38, 36, 34, 32, 30, 28, 26, 24, 22, 20, 18, 16, 14, 12, 10, 8, 6, 4, 2, and 0 mediums.

In one aspect, the peanut paste includes a weight ratio of splits to mediums from about 60 to about 40 splits to about 40 to about 60 mediums (e.g., 60-40 splits:40-60 mediums). In another aspect, the weight ratio of splits to mediums can be from about 30 to about 70 splits to about 70 to about 30 mediums. For example, the weight ratio of splits to mediums can be from about 30, 32, 34, 36, 38, 40, 42, 44, 46, 48, 50, 52, 54, 56, 58, 60, 62, 64, 66, 68, and 70 splits to about 70, 68, 66, 64, 62, 60, 58, 56, 54, 52, 50, 48, 46, 44, 42, 40, 38, 36, 34, 32, and 30 mediums.

In one aspect, the peanut paste includes a weight ratio of splits to mediums from about 30 to about 10 splits to about 70 to about 90 mediums (e.g., 30-10 splits:70-90 mediums). In another aspect, the weight ratio of splits to mediums can be from about 0 to about 40 splits to about 100 to about 60 mediums. For example, the weight ratio of splits to mediums can be from about 0, 2, 4, 6, 8, 10, 12, 14, 16, 18, 20, 22, 24, 26, 28, 30, 32, 34, 36, 38, and 40 splits to about 100, 98, 96, 94, 92, 90, 88, 86, 84, 82, 80, 78, 76, 74, 72, 70, 68, 66, 64, 62, and 60 mediums.

In one aspect, the peanut paste includes a weight ratio of splits to jumbo from about 30 to about 10 splits to about 70 to about 90 jumbo (e.g., 30-10 splits:70-90 jumbo). In another aspect, the weight ratio of splits to jumbo can be from about 0 to about 40 splits to about 100 to about 60 jumbo. For example, the weight ratio of splits to jumbo can be from about 0, 2, 4, 6, 8, 10, 12, 14, 16, 18, 20, 22, 24, 26, 28, 30, 32, 34, 36, 38, and 40 splits to about 100, 98, 96, 94, 92, 90, 88, 86, 84, 82, 80, 78, 76, 74, 72, 70, 68, 66, 64, 62, and 60 jumbo.

In one aspect, the peanut paste includes a weight ratio of splits to jumbo from about 60 to about 40 splits to about 40 to about 60 jumbo (e.g., 60-40 splits:40-60 jumbo). In another aspect, the weight ratio of splits to jumbo can be from about 30 to about 70 splits to about 70 to about 30 jumbo. For example, the weight ratio of splits to jumbo can be from about 30, 32, 34, 36, 38, 40, 42, 44, 46, 48, 50, 52, 54, 56, 58, 60, 62, 64, 66, 68, and 70 splits to about 70, 68, 66, 64, 62, 60, 58, 56, 54, 52, 50, 48, 46, 44, 42, 40, 38, 36, 34, 32, and 30 jumbo.

In one aspect, the peanut paste includes a weight ratio of splits to jumbo from about 90 to about 70 splits to about 30 to about 10 jumbo (e.g., 90-70 splits:30-10 jumbo). In another aspect, the weight ratio of splits to jumbo can be from about 60 to about 100 splits to about 40 to about 0 jumbo. For example, the weight ratio of splits to jumbo can be from about 60, 62, 64, 66, 68, 70, 72, 74, 76, 78, 80, 82, 84, 86, 88, 90, 92, 94, 96, 98, and 100 splits to about 40, 38, 36, 34, 32, 30, 28, 26, 24, 22, 20, 18, 16, 14, 12, 10, 8, 6, 4, 2, and 0 jumbo.

The peanut butter base can include the peanut paste in a weight percentage of total content from about 86% to about 89%. The weight percentage of the peanut butter base in the peanut butter spread with sliced peanuts can depend in part on the total amount of sliced peanuts present in the peanut butter spread with sliced peanuts. In another aspect, the peanut butter base can include the peanut paste in a weight percentage of total content of about 80% to about 94%. For example, the weight percentage of the peanut paste in the peanut butter base can be from about 80%, 80.5%, 81%, 81.5%, 82%, 82.5%, 83%, 83.5%, 84%, 84.5%, 85%, 85.5%, 86%, 86.5%, 87%, 87.5%, 88%, 88.5%, 89%, 89.5%, 90%, 90.5%, 91%, 91.5%, 92%, 92.5%, 93%, 93.5%, and 94% to about 80%, 80.5%, 81%, 81.5%, 82%, 82.5%, 83%, 83.5%, 84%, 84.5%, 85%, 85.5%, 86%, 86.5%, 87%, 87.5%, 88%, 88.5%, 89%, 89.5%, 90%, 90.5%, 91%, 91.5%, 92%, 92.5%, 93%, 93.5%, and 94%.

B. Sugar

The peanut butter base can include a sweetening agent, such as sugar. In one aspect, the peanut butter base includes granulated, white sugar in a weight percentage of total peanut butter base content from about 5% to about 8%. The weight percentage of sugar in the peanut butter spread with sliced peanuts can depend in part on the total amount of sliced peanuts present in the peanut butter spread with sliced peanuts. In one aspect, the peanut butter base includes granulated, white sugar in a weight percentage of total peanut butter base content from about 15% to about 19%. In another aspect, the weight percentage of sugar in the peanut butter base can be from about 3% to about 20%. For example, the weight percentage of the sugar in the peanut butter base can be from about 3%, 3.5%, 4%, 4.5%, 5%, 5.5%, 6%, 6.5%, 7%, 7.5%, 8%, 8.5%, 9%, 9.5%, 10%, 10.5%, 11%, 11.5%, 12%, 12.5%, 13%, 13.5%, 14%, 14.5%, 15%, 15.5%, 16%, 16.5%, 17%, 17.5%, 18%, 18.5%, 19%, 19.5%, and 20% to about 3%, 3.5%, 4%, 4.5%, 5%, 5.5%, 6%, 6.5%, 7%, 7.5%, 8%, 8.5%, 9%, 9.5%, 10%, 10.5%, 11%, 11.5%, 12%, 12.5%, 13%, 13.5%, 14%, 14.5%, 15%, 15.5%, 16%, 16.5%, 17%, 17.5%, 18%, 18.5%, 19%, 19.5%, and 20%.

In another example, the weight percentage of the sugar in the peanut butter base can be from about 5.5% to about 7.5%. For example, the weight percentage of the sugar in the peanut butter base can be from about 5.5%, 5.6%, 5.7%, 5.8%, 5.9%, 6.0%, 6.1%, 6.2%, 6.3%, 6.4%, 6.5%, 6.6%, 6.7%, 6.8%, 6.9%, 7.0%, 7.1%, 7.2%, 7.3%, 7.4%, and 7.5% to about 5.5%, 5.6%, 5.7%, 5.8%, 5.9%, 6.0%, 6.1%, 6.2%, 6.3%, 6.4%, 6.5%, 6.6%, 6.7%, 6.8%, 6.9%, 7.0%, 7.1%, 7.2%, 7.3%, 7.4%, and 7.5%.

In another aspect, (e.g., for a sweeter peanut butter product), the peanut butter base can include sugar as a weight percentage of the total peanut butter base content from about 10% to about 25%. For example, the peanut butter base can include sugar as a weight percentage of the total peanut butter base content from about 10%, 10.5%, 11%, 11.5%, 12%, 12.5%, 13%, 13.5%, 14%, 14.5%, 15%, 15.5%, 16%, 16.5%, 17%, 17.5%, 18%, 18.5%, 19%, 19.5%, 20%, 20.5%, 21%, 21.5%, 22%, 22.5%, 23%, 23.5%, 24%, 24.5%, and 25% to about 10%, 10.5%, 11%, 11.5%, 12%, 12.5%, 13%, 13.5%, 14%, 14.5%, 15%, 15.5%, 16%, 16.5%, 17%, 17.5%, 18%, 18.5%, 19%, 19.5%, 20%, 20.5%, 21%, 21.5%, 22%, 22.5%, 23%, 23.5%, 24%, 24.5%, and 25%.

The type of sugar utilized can depend on whether additional sweeteners and/or flavoring agents are present in the peanut butter base or in the finished peanut butter spread with sliced peanuts. The sugar, the additional sweeteners, and/or the flavoring agents can include, but are not limited to, beet sugar, cane sugar, sugar mixtures, sucrose, fructose, dextrose, high fructose corn syrup, lactose, maltose, maltose syrup, artificial sweeteners (e.g., aspartame, acesulfame potassium, sucralose, saccharine, cyclamate, glycyrrhizin), corn syrup solids, and the like.

C. Shortening

The peanut butter base can include a shortening agent, such as an oil-based shortening blend. In one aspect, the peanut butter base includes a cottonseed/rapeseed shortening blend in a weight percentage of total peanut butter base content of about 0.5% to about 2%. The weight percentage of shortening in the peanut butter spread with sliced peanuts can depend in part on the total amount of sliced peanuts present in the peanut butter spread with sliced peanuts. In one aspect, the cottonseed oil and the rapeseed oil in the cottonseed/rapeseed shortening blend are present in a weight ratio from about 70 to about 50 cottonseed oil to about 30 to about 50 rapeseed oil. The oil-based shortening agent can include oils other than/in addition to cottonseed oils and rapeseed oils, including, but not limited to palm oilseed, edible oils, vegetable oils, and the like. In one aspect, the weight percentage of the shortening agent in the peanut butter base can be from about 0% to about 2.5%. For example, the weight percentage of the shortening agent in the peanut butter base can be from about 0.0%, 0.1%, 0.2%, 0.3%, 0.4%, 0.5%, 0.6%, 0.7%, 0.8%, 0.9%, 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, and 2.5% to about 0.0%, 0.1%, 0.2%, 0.3%, 0.4%, 0.5%, 0.6%, 0.7%, 0.8%, 0.9%, 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, and 2.5%. In an aspect, the weight percentage of the shortening agent in the peanut butter base is below 5% of the total peanut butter base content.

D. Salt

The peanut butter base can include salt, such as a ground salt product. In one aspect, the peanut butter base includes a salt flour in a weight percentage of total peanut butter base content from about 0.75% to about 1.5%. The weight percentage of salt in the peanut butter spread with sliced peanuts can depend in part on the total amount of sliced peanuts present in the peanut butter spread with sliced peanuts. The salt can include various types (e.g., sea salt, kosher salt, rock salt, and the like) and sizes (e.g., finely ground salt, flour-cut salt, pulverized salt, and the like) of salts. In another aspect, the weight percentage of the salt in the peanut butter base can be from about 0% to about 2.5%. For example, the weight percentage of the salt in the peanut butter base can be from about 0.0%, 0.1%, 0.2%, 0.3%, 0.4%, 0.5%, 0.6%, 0.7%, 0.8%, 0.9%, 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, and 2.5% to about 0.0%, 0.1%, 0.2%, 0.3%, 0.4%, 0.5%, 0.6%, 0.7%, 0.8%, 0.9%, 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, and 2.5%. In an aspect, the weight percentage of the salt in the peanut butter base is below 5% of the total peanut butter base content.

E. Oil

The peanut butter base can include an added oil, such as an oil in addition to those naturally present in the peanut paste. The added oil can include any glyceride with at least one fatty acid, and/or one or more liquid oils such as a liquid vegetable oil. The added oil can include an antioxidant for preserving the oil. In one aspect, the added oil is a liquid vegetable oil such a coconut oil, corn oil, cottonseed oil, olive oil, palm oil, peanut oil, rapeseed oil, canola oil, safflower oil, sesame oil, soybean oil, and/or sunflower oil. The added oil can be added to the peanut butter formulation to help manage the flow characteristics of the formulation and/or to assist in blending the formulation. In one aspect, the peanut butter base includes an added peanut oil in a weight percentage of total peanut butter base content from about 0.5% to about 9%. The weight percentage of added oil in the peanut butter spread with sliced peanuts can depend in part on the total amount of sliced peanuts present in the peanut butter spread with sliced peanuts. In another aspect, the weight percentage of the added oil in the peanut butter base can be from about 0% to about 10%. For example, the weight percentage of the added oil in the peanut butter base can be from about 0%, 0.5%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, and 10% to about 0%, 0.5%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, and 10%.

F. Additional Sweeteners and/or Flavoring Agents

The peanut butter base can also include additional sweeteners and/or flavoring agents to sweeten, flavor, or enhance the flavor of the peanut butter spread with sliced peanuts to a desired taste profile. For example, the additional sweeteners and/or flavoring agents can include, but are not limited to, honey (e.g., extra light amber honey), molasses (e.g., unsulphured sugarcane molasses), citric acid, and the like. In one aspect, the peanut butter base includes extra light amber honey in a weight percentage of total peanut butter base content from about 2.5% to about 4% and includes unsulphured sugarcane molasses in a weight percentage of total peanut butter base content from about 0.5% to about 1.7%. The weight percentage of additional sweeteners and/or flavoring agents in the peanut butter spread with sliced peanuts can depend in part on the total amount of sliced peanuts present in the peanut butter spread with sliced peanuts. In another aspect, the weight percentage of the honey in the peanut butter base can be from about 2% to about 5%. For example, the weight percentage of the honey in the peanut butter base can be from about 2.0%, 2.2%, 2.4%, 2.6%, 2.8%, 3.0%, 3.2%, 3.4%, 3.6%, 3.8%, 4.0%, 4.2%, 4.4%, 4.6%, 4.8%, and 5.0% to about 2.0%, 2.2%, 2.4%, 2.6%, 2.8%, 3.0%, 3.2%, 3.4%, 3.6%, 3.8%, 4.0%, 4.2%, 4.4%, 4.6%, 4.8%, and 5.0%. In another aspect, the weight percentage of the molasses in the peanut butter base can be from about 0% to about 3%. For example, the weight percentage of the molasses in the peanut butter base can be from about 0.0%, 0.2%, 0.4%, 0.6%, 0.8%, 1.0%, 1.2%, 1.4%, 1.6%, 1.8%, 2.0%, 2.2%, 2.4%, 2.6%, 2.8%, and 3.0% to about 0.0%, 0.2%, 0.4%, 0.6%, 0.8%, 1.0%, 1.2%, 1.4%, 1.6%, 1.8%, 2.0%, 2.2%, 2.4%, 2.6%, 2.8%, and 3.0%.

2. Sliced Peanuts

The sliced peanuts are added to and/or blended with the peanut butter base to form the peanut butter spread with sliced peanuts. In one aspect, the peanuts used to provide the sliced peanuts are provided in the same size ratios as the peanuts used to provide the peanut paste. By utilizing the same peanuts, a consistent flavor profile for the peanut butter spread with sliced peanuts can be provided. In one aspect, the sliced peanuts have the following size distribution following a slicing operation: about 20% of the sliced peanuts remain on 10 Mill Grade Mesh (e.g., mesh opening of 2032 microns), about 60% of the sliced peanuts remain on 22 TBC (Tensile Bolt Cloth) Mesh (e.g., mesh opening of 965 microns), and about 20% of the sliced peanuts fall through the 22 TBC Mesh. In one aspect, processing the peanut butter spread with sliced peanuts resulted in between about 8.7 times and 19 times increased productivity when utilizing a slicing operation for the finishing step of the textured peanuts as compared to a grinding operation for the finishing step of the textured peanuts. This productivity increase can be at least partially attributed to avoiding a cleaning operation associated with clogged roller mill devices that release peanut oils when attempting to achieve a fine particle size, as described herein.

In one aspect, the sliced peanuts include a weight ratio of splits to mediums from about 90 to about 70 splits to about 30 to about 10 mediums (e.g., 90-70 splits:30-10 mediums). In another aspect, the weight ratio of splits to mediums can be from about 60 to about 100 splits to about 40 to about 0 mediums. For example, the weight ratio of splits to mediums can be from about 60, 62, 64, 66, 68, 70, 72, 74, 76, 78, 80, 82, 84, 86, 88, 90, 92, 94, 96, 98, and 100 splits to about 40, 38, 36, 34, 32, 30, 28, 26, 24, 22, 20, 18, 16, 14, 12, 10, 8, 6, 4, 2, and 0 mediums.

In one aspect, the sliced peanuts include a weight ratio of splits to mediums from about 60 to about 40 splits to about 40 to about 60 mediums (e.g., 60-40 splits:40-60 mediums). In another aspect, the weight ratio of splits to mediums can be from about 30 to about 70 splits to about 70 to about 30 mediums. For example, the weight ratio of splits to mediums can be from about 30, 32, 34, 36, 38, 40, 42, 44, 46, 48, 50, 52, 54, 56, 58, 60, 62, 64, 66, 68, and 70 splits to about 70, 68, 66, 64, 62, 60, 58, 56, 54, 52, 50, 48, 46, 44, 42, 40, 38, 36, 34, 32, and 30 mediums.

In one aspect, the sliced peanuts include a weight ratio of splits to mediums from about 30 to about 10 splits to about 70 to about 90 mediums (e.g., 30-10 splits:70-90 mediums). In another aspect, the weight ratio of splits to mediums can be from about 0 to about 40 splits to about 100 to about 60 mediums. For example, the weight ratio of splits to mediums can be from about 0, 2, 4, 6, 8, 10, 12, 14, 16, 18, 20, 22, 24, 26, 28, 30, 32, 34, 36, 38, and 40 splits to about 100, 98, 96, 94, 92, 90, 88, 86, 84, 82, 80, 78, 76, 74, 72, 70, 68, 66, 64, 62, and 60 mediums.

In one aspect, the sliced peanuts include a weight ratio of splits to jumbo from about 30 to about 10 splits to about 70 to about 90 jumbo (e.g., 30-10 splits:70-90 jumbo). In another aspect, the weight ratio of splits to jumbo can be from about 0 to about 40 splits to about 100 to about 60 jumbo. For example, the weight ratio of splits to jumbo can be from about 0, 2, 4, 6, 8, 10, 12, 14, 16, 18, 20, 22, 24, 26, 28, 30, 32, 34, 36, 38, and 40 splits to about 100, 98, 96, 94, 92, 90, 88, 86, 84, 82, 80, 78, 76, 74, 72, 70, 68, 66, 64, 62, and 60 jumbo.

In one aspect, the sliced peanuts include a weight ratio of splits to jumbo from about 60 to about 40 splits to about 40 to about 60 jumbo (e.g., 60-40 splits:40-60 jumbo). In another aspect, the weight ratio of splits to jumbo can be from about 30 to about 70 splits to about 70 to about 30 jumbo. For example, the weight ratio of splits to jumbo can be from about 30, 32, 34, 36, 38, 40, 42, 44, 46, 48, 50, 52, 54, 56, 58, 60, 62, 64, 66, 68, and 70 splits to about 70, 68, 66, 64, 62, 60, 58, 56, 54, 52, 50, 48, 46, 44, 42, 40, 38, 36, 34, 32, and 30 jumbo.

In one aspect, the sliced peanuts include a weight ratio of splits to jumbo from about 90 to about 70 splits to about 30 to about 10 jumbo (e.g., 90-70 splits:30-10 jumbo). In another aspect, the weight ratio of splits to jumbo can be from about 60 to about 100 splits to about 40 to about 0 jumbo. For example, the weight ratio of splits to jumbo can be from about 60, 62, 64, 66, 68, 70, 72, 74, 76, 78, 80, 82, 84, 86, 88, 90, 92, 94, 96, 98, and 100 splits to about 40, 38, 36, 34, 32, 30, 28, 26, 24, 22, 20, 18, 16, 14, 12, 10, 8, 6, 4, 2, and 0 jumbo.

In one aspect, the peanut butter spread with sliced peanuts includes the sliced peanuts in a weight percentage of total content from about 10% to about 20%. In another aspect, the weight percentage of the sliced peanuts in the peanut butter spread with sliced peanuts can be from about 5% to about 25%. For example, the weight percentage of the sliced peanuts in the peanut butter spread with sliced peanuts can be from about 5%, 5.5%, 6%, 6.5%, 7%, 7.5%, 8%, 8.5%, 9%, 9.5%, 10%, 10.5%, 11%, 11.5%, 12%, 12.5%, 13%, 13.5%, 14%, 14.5%, 15%, 15.5%, 16%, 16.5%, 17%, 17.5%, 18%, 18.5%, 19%, 19.5%, 20%, 20.5%, 21%, 21.5%, 22%, 22.5%, 23%, 23.5%, 24%, 24.5%, and 25% to about 5%, 5.5%, 6%, 6.5%, 7%, 7.5%, 8%, 8.5%, 9%, 9.5%, 10%, 10.5%, 11%, 11.5%, 12%, 12.5%, 13%, 13.5%, 14%, 14.5%, 15%, 15.5%, 16%, 16.5%, 17%, 17.5%, 18%, 18.5%, 19%, 19.5%, 20%, 20.5%, 21%, 21.5%, 22%, 22.5%, 23%, 23.5%, 24%, 24.5%, and 25%.

II. Process for Producing the Nut Butter Spread with Sliced Nuts

Referring to FIG. 1, a process 100 is shown for producing a nut butter spread with sliced nuts. The process 100 includes forming a nut butter base in operation 102. The nut butter base generally includes a nut paste, sugar, shortening, salt, and vegetable oil blended together to a smooth and creamy consistency, such as by including substantially no granule portions. In various aspects, the nut butter base can also include additional sweeteners and/or flavoring agents including, but not limited to, honey and molasses. For example, the operation 102 can include forming a nut paste by feeding nuts into a grinding system (e.g., into a Bauer mill at 4 klb/hr, a Urschel Comitrol grinder at 10 klb/hr, or the like) and subsequently blending the ground nuts in a mixing screw auger at a temperature of about 180° F. The nut paste, sugar, shortening, salt, and vegetable oil are then blended together, such as in a mixing screw auger at a temperature of about 160° F. for about one minute, or until the nut butter base has a smooth and creamy consistency. Process 100 continues to operation 104 where sliced nuts are introduced to the nut butter base. In embodiments, the sliced nuts have the following size distribution: about 20% of the sliced nuts remain on 10 Mill Grade Mesh (e.g., mesh opening of 2032 microns), about 60% of the sliced nuts remain on 22 TBC (Tensile Bolt Cloth) Mesh (e.g., mesh opening of 965 microns), and about 20% of the sliced nuts fall through the 22 TBC Mesh. For example, the process 100 can include a slicing operation 106, which begins with operation 108 where nuts are prepared for the slicing operation or nuts are received that have been pre-prepared. The preparation of nuts can include one or more of a roasting operation, a shelling operation, a blanching operation, and a splitting operation. For example, the roasting operation can include a dry roasting process or an oil roasting process, which in the case of peanuts cause amino acids and carbohydrates within the peanut to react to produce flavorful tetrahydrofuran derivatives, to dry the peanuts, and to brown the peanuts. Dry roasting operations can utilize a heater to heat the nuts to about 320° F. for roasting, although the roasting temperature can vary depending on the moisture content of the nuts. Prior to roasting or following in-shell roasting, the shelling operation removes the nuts from their associated shells, such as by a crushing operation utilizing rollers spaced apart to crush the shell without crushing the contained nut. The blanching operation removes any skins covering the nutmeat, and can include heating the shelled nuts (e.g., in a furnace, in a water bath, etc.) and subsequently peeling the loosened skin from the nuts (e.g., by introducing the heated shelled nuts to abrasive rollers, air impact, spinning containers, etc.). For peanut processing, dry blanching operations can also remove the kernel hearts, which can affect peanut butter flavor. Such dry blanching operations can heat the peanuts to about 280° F. for about 25 minutes to crack and loosen the skins prior to removal.

Figure 2:
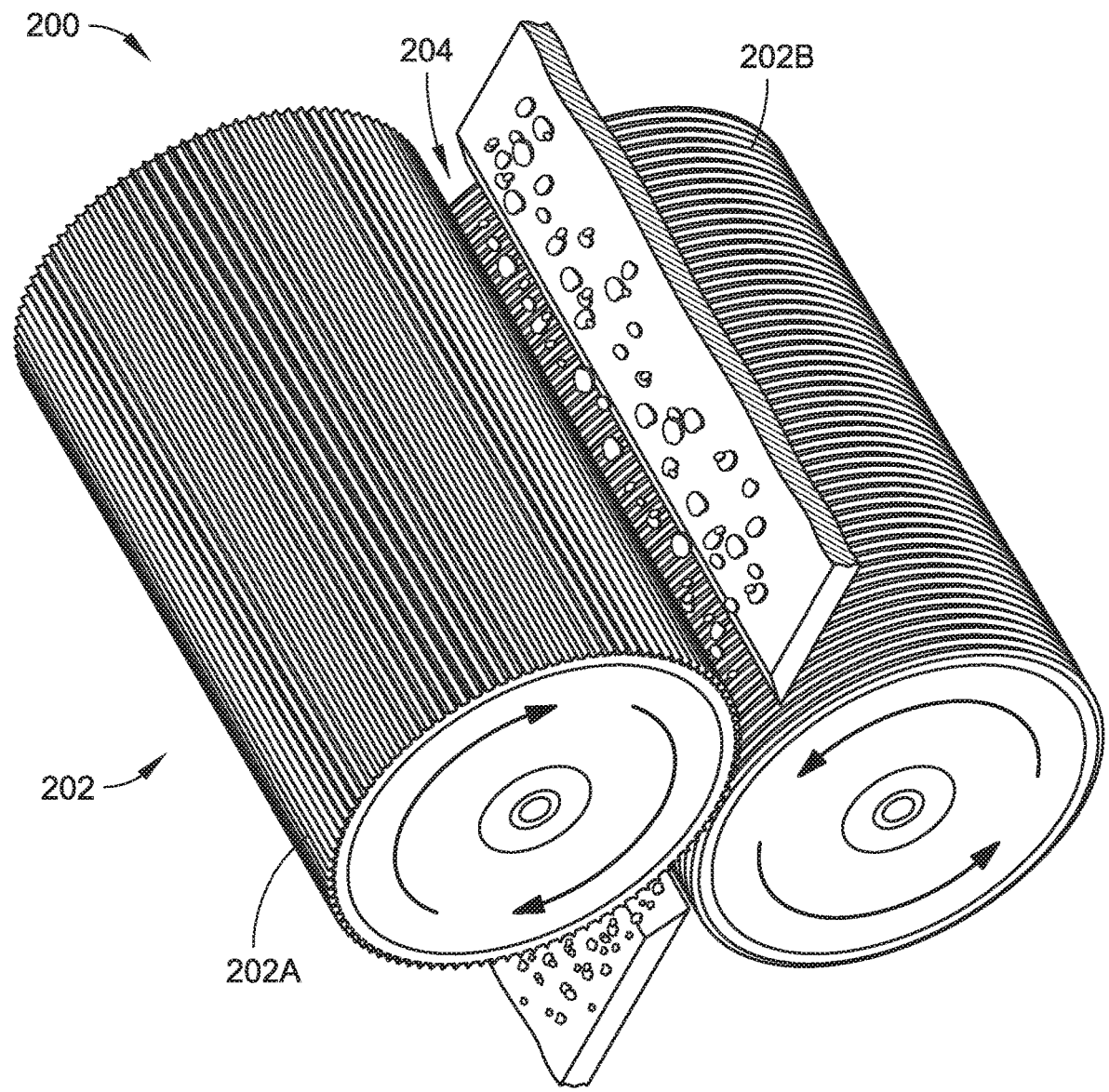
FIG. 2 is a top view of a roller mill device for crushing nuts.

Following receipt and/or preparation of the nuts in operation 108, the slicing operation 106 includes a decision operation 110 to determine whether to crush the nuts prior to slicing. Crushing the nuts prior to slicing can impact the overall size distribution and/or surface area characteristics of the sliced nuts for introduction to the nut butter base. An example crushing operation 112 includes introducing the nuts to a roller mill 200, shown in FIG. 2. The roller mill 200 includes a hopper (not shown) structured to gravity-feed the nuts to a pair of rollers 202 having a roll gap 204 between the rollers 202. The rollers 202 spin toward the roll gap 204, such that each roller 202 spins opposite of the respective other roller. In embodiments, the rollers 202 have a surface texture (e.g., roll corrugation) that can influence the particle size of the resultant crushed nuts. The roller mill 200 shown in FIG. 2 includes rollers having perpendicular corrugations. For instance, the roller 202a includes a corrugation running substantially horizontally along the outer surface of the roller 202a, where the roller 202b includes a corrugation running substantially vertical along the outer surface of the roller 202b. The nuts introduced to the roller mill 200 are then broken into smaller pieces due to pressure applied to the nuts by the perpendicularly-corrugated rollers 202. The rate of the rotation of the rollers 202 can vary depending on throughput of the crushing operation 112, where in an embodiment, the rollers 202 are rotated at a rate of about 50 rotations per minute (RPM) to about 90 rotations per minute. While the roll gap 204 can be adjusted, it has been found for peanut processing that if the roll gap 204 is too small (e.g., less than about 3/16 inches), the pressure exerted by the rollers 202 on the peanuts causes release of substantial amounts of peanut oils, as opposed to simply crushing the peanuts. The release of oils by the nuts can clog and foul the rollers 202, which can require process downtime and/or additional backup roller mills in order to clean the clogged rollers 202. For example, in one aspect, processing the peanut butter spread with sliced peanuts resulted in between about 8.7 times and 19 times increased productivity when utilizing a slicing operation (described further herein) for the finishing step of the textured peanuts as compared to a grinding operation using the roller mill 200 for the finishing step of the textured peanuts.

Figure 3:
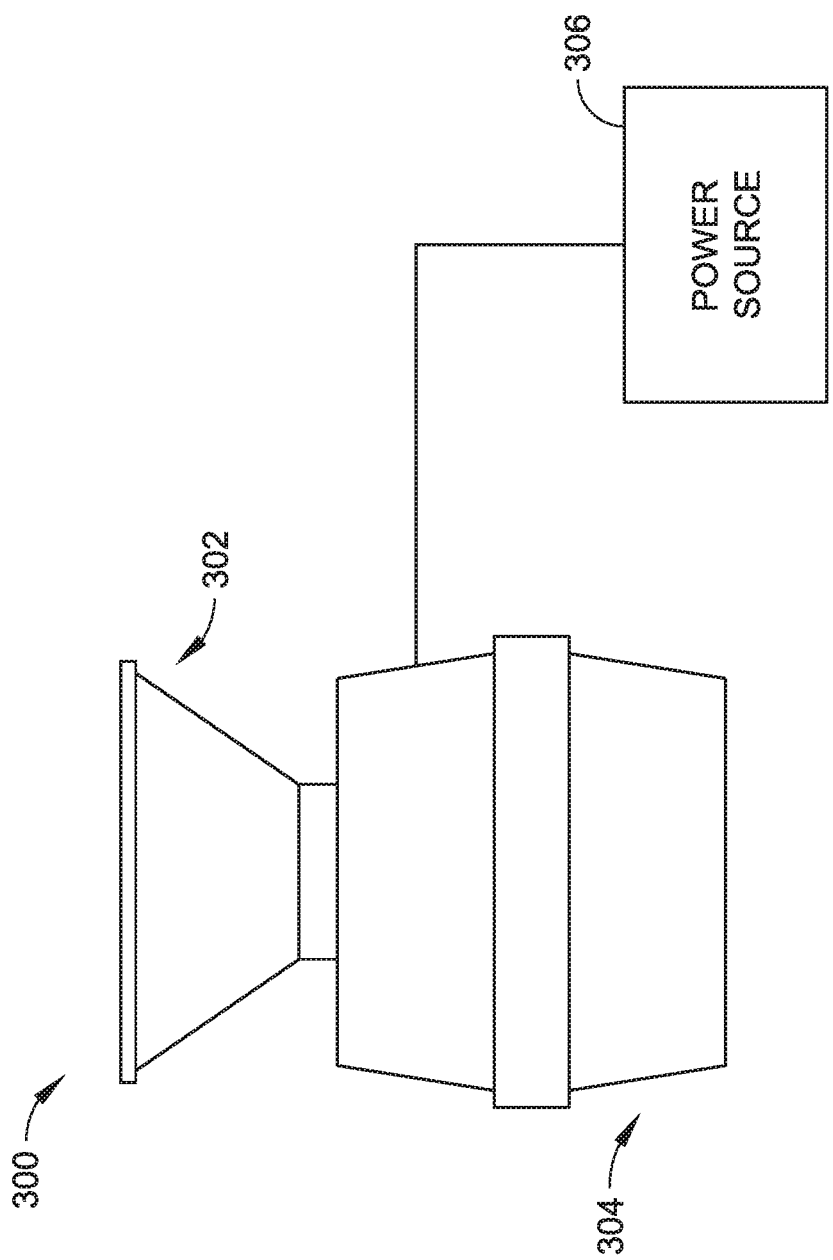
FIG. 3 is a schematic diagram of a powered nut slicer system configured to centrifugally slice nuts fed to a nut slicer.
Figure 4:
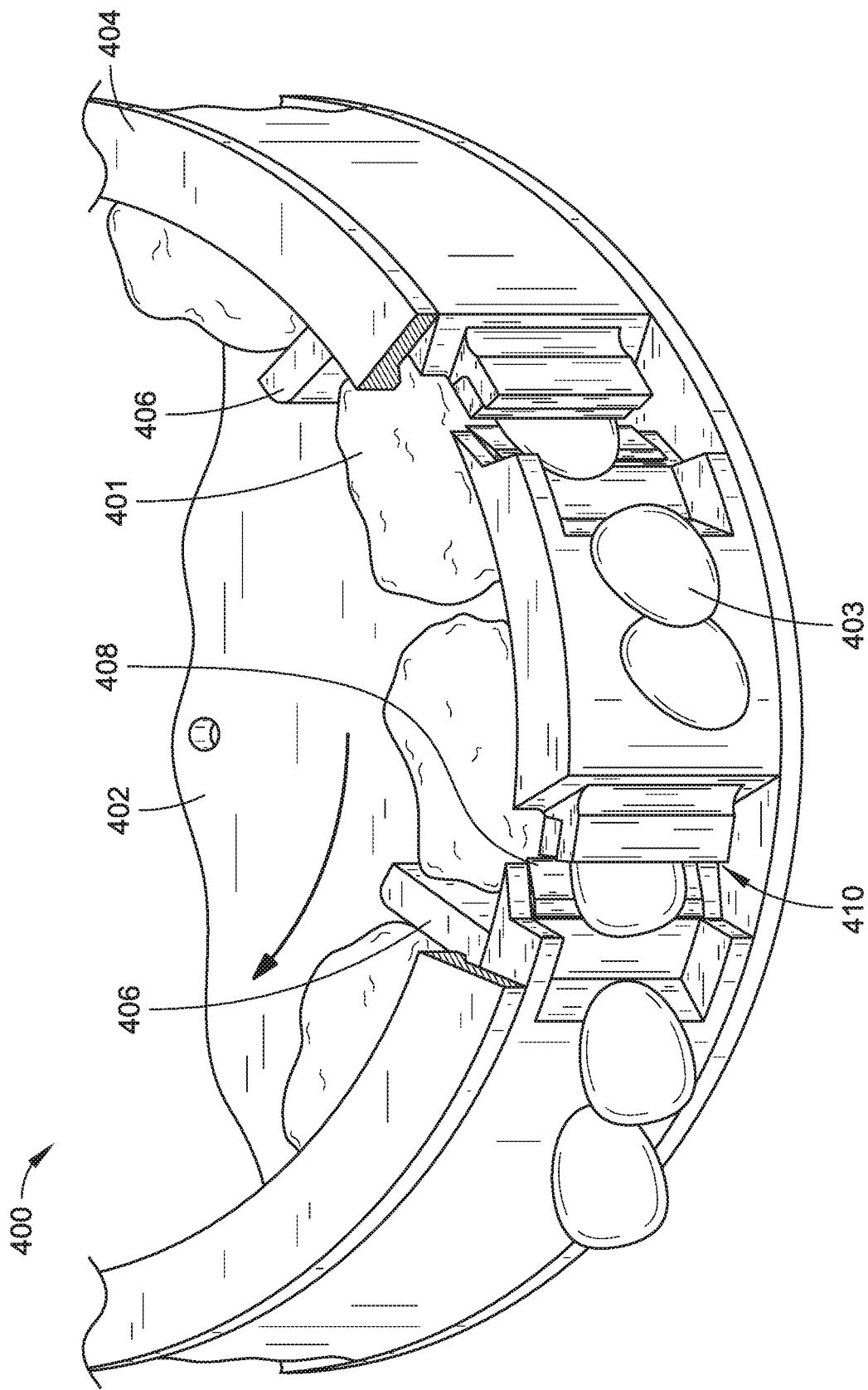
FIG. 4 is a partial perspective view of a nut slicer configured to centrifugally slice nuts when the nut slicer is rotated within the powered nut slicer system of FIG. 3.

The process 100 further includes slicing the nuts in a slicer in operation 114, which can occur subsequent to crushing operation 112 or without crushing operation 112. For example, the crushed or uncrushed nuts are introduced to a powered nut slicer system 300 (shown in FIG. 3) configured to centrifugally slice nuts. The powered nut slicer 300 generally includes a feed portion 302 (e.g., a hopper, gravity-fed hopper, etc.), a centrifugal slicer portion 304, and a power source 306 configured to power and spin the centrifugal slicer portion 304. The feed portion 302 receives the crushed or uncrushed nuts and introduces the crushed or uncrushed nuts to the centrifugal slicer portion 304. The centrifugal slicer portion 304 includes a slicer 400 (shown in FIG. 4) having a spinning disc 402 configured to spin relative to a frame 404. In embodiments, the spinning disc 402 spins at a rate of about 350 rotations per minute (RPM) to about 550 rotations per minute (RPM). The spinning disc 402 includes one or more stop portions 406 (e.g., paddle, impeller, baffle, etc.) extending inwardly from an outer circumference of the spinning disc, which spin relative to the frame 404 due to motion of the spinning disc 402. The frame 404 includes one or more slicing implements 408 (e.g., knives, blades, etc.) adjacent an opening 410 through the frame 404 through which sliced nuts can exit the slicer 400 after impacting with the slicing implements 408. During operation, the crushed or uncrushed nuts (shown as 401) are directed from the feed portion 302 to the spinning disc 402, which is spun when powered from the power source 306. The spinning motion of the spinning disc 402 imparts two primary forces on the nuts 401 introduced to the slicer 400: a radial force (or centrifugal force) of the disc spinning causing the nuts 401 to be pushed outward from the disc towards the frame 404 and associated slicing implements 408, and an angular force of the stop portions 406 spinning and carrying the nuts 401 along an interior surface of the frame 404, which introduces the nuts 401 to the slicing implements 408 to slice portions of the nuts, where the sliced nut portions 403 are removed from the slicer 400 via the opening 410. The forces used to slice the nuts in the slicer 400 differ from the pressure imparted to the nuts in the roller mill 200, allowing the slicer 400 to produce the sliced nut portions 403 without pressing substantial amount of oils from the nuts, as can occur with operation of the roller mill 200, thereby avoiding substantial process downtime due to clogging to fouling of process components. The sliced nut portions 403 are then introduced to the nut butter base in operation 104 following operation 102. For example, the sliced nut portions 403 can be conveyed from the powered nut slicer system 300 to the nut butter base held in a holding tank, a blending tank, or the like.

Following operation 104, the process includes a blending operation 116 where the nut butter base and the sliced nut portions 403 are blended together to form a finished nut butter spread with sliced nuts. For example, the nut butter base and the sliced nut portions 403 can be blended via an agitated vessel at a temperature of about 90° F. to about 110° F. for about 10 to 20 minutes. Process 100 further includes a packaging operation 118 where the finished nut butter spread with sliced nuts is packaged in a container. For example, the finished nut butter spread with sliced nuts can be introduced to a filler apparatus, which places the finished nut butter spread with sliced nuts into containers, such as bottles, jars, pouches, cans, cups, or the like then caps and/or seals the container. In embodiments, the filling operation includes filling the finished nut butter spread in the containers at a fill rate of about 90 lb/hr to about 150 lb/hr, or more specifically at a fill rate of about 108 lb/hr to about 130 lb/hr. The containers can then be transported to packaging lines where the containers are packaged for shipping. For example, the containers can be packaged for shipping at a rate of about 115 to about 140 jars per minute.

III. Characteristics of the Peanut Butter Spread with Sliced Peanuts

Figure 5:
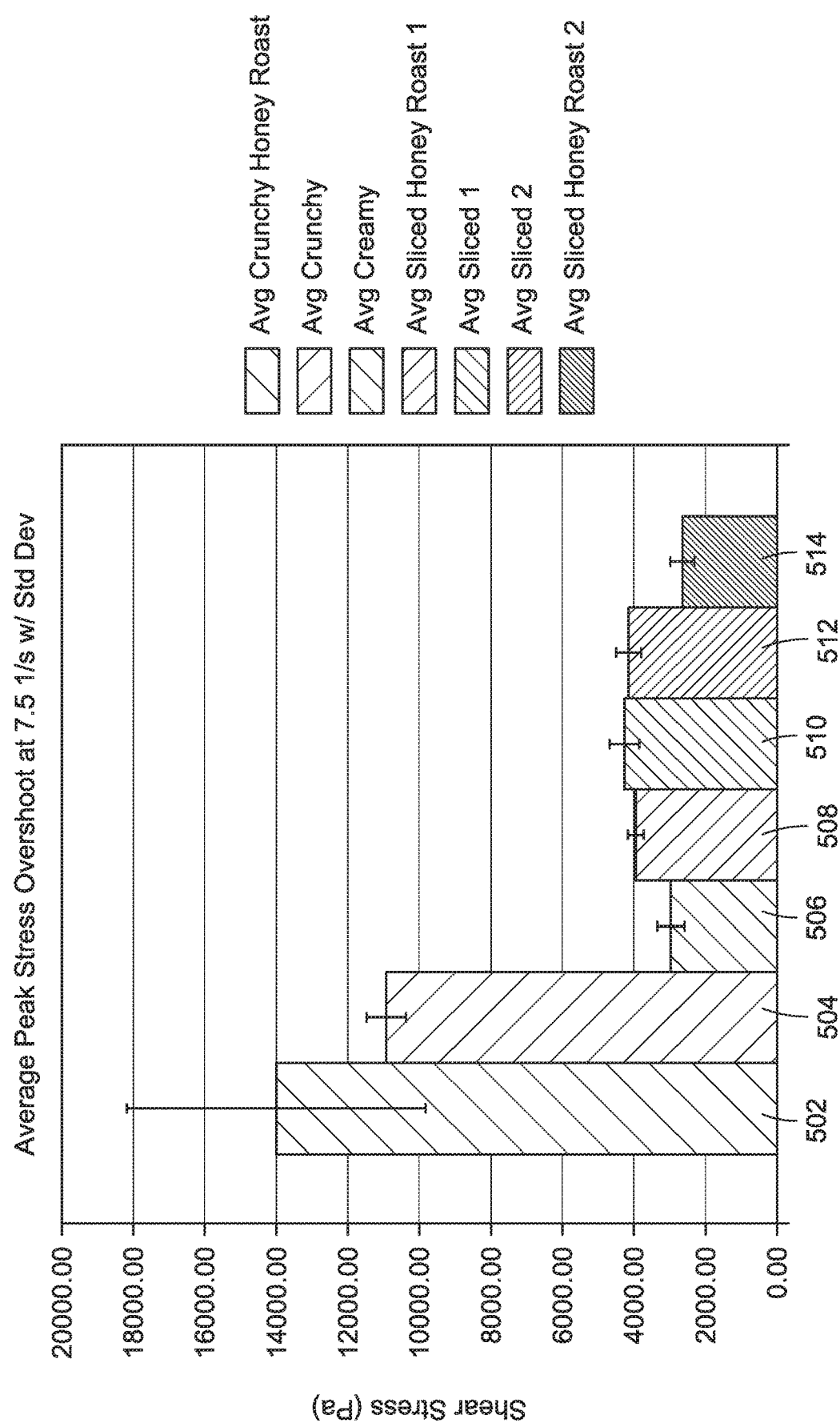
FIG. 5 is a graph illustrating average peak stress overshoot for a plurality of nut butter spreads.

Spreadability is a consumer-noticeable attribute of peanut butter. One issue when consuming "crunchy" nut butter products is the difficulty with spreading the product. The spreadability of a product, such as peanut butter, can be correlated to the excess stress required to begin to make the product flow at a particular rate (see, e.g., Kokini et al., A Model of Food Spreadability From Fluid Mechanics, Journal of Texture Studies 13(1982) 211-227, which is incorporated herein by reference). This phenomenon is called stress overshoot. The magnitude of the stress overshoot can be determined by rheometry. FIG. 5 displays a graph illustrating average peak stress overshoot for seven types of peanut butter spreads, where the peak stress overshoot refers to a peak stress obtained during the first 10 seconds of a rheometry study, outlined below. The seven types of peanut butter spreads are as follows: a crunchy honey roast peanut butter (labeled as 502 in FIG. 5), a crunchy peanut butter (labeled as 504), a creamy peanut butter (e.g., containing no granular additive for texture; labeled as 506), a first honey roast peanut butter spread with sliced peanuts (labeled as 508), a first peanut butter spread with sliced peanuts (labeled as 510), a second peanut butter spread with sliced peanuts (labeled as 512), and a second honey roast peanut butter spread with sliced peanuts (labeled as 514). The formulation of the peanut butter base for each of the crunchy peanut butter (labeled as 504), the creamy peanut butter (labeled as 506), the first peanut butter spread with sliced peanuts (labeled as 510), and the second peanut butter spread with sliced peanuts (labeled as 512) was the same. Thus, the differences between respective peanut butters relate to the size of peanut granule added (if any). Similarly, the formulation of the peanut butter base for each of the crunchy honey roast peanut butter (labeled as 502) and the second honey roast peanut butter spread with sliced peanuts (labeled as 514) was the same. Thus, the differences between respective honey roast peanut butters relate to the size of peanut granule added. As can be seen, the average peak stress overshoot (i.e., the spreadability) of the four peanut butter spreads with sliced peanuts (about 3950 Pa for 508, about 4277 Pa for 510, about 4152 Pa for 512, about 2666 Pa for 514) is substantially the same as the average spreadability for the creamy peanut butter having no granular additive for texture (about 2964 Pa for 506). For example, the average peak stress overshoot (i.e., the spreadability) of the four peanut butter spreads with sliced peanuts (508, 510, 512, 514) is about 50% to about 150% of the average peak stress overshoot of the nut butter base (e.g., the creamy peanut butter having no granular additive for texture). Further, the spreadability of the four peanut butter spreads with sliced peanuts (508, 510, 512, 514) substantially differs from the spreadability of each of the two crunchy peanut butters (about 13,983 Pa for 502, about 10,933 Pa for 504), with the four peanut butter spreads with sliced peanuts (508, 510, 512, 514) being substantially more spreadable than the crunchy peanut butters (502, 504). For example, each of the four peanut butter spreads with sliced peanuts (508, 510, 512, 514) have an average peak stress overshoot that is less than half that of each of the crunchy peanut butters (502, 504).

The nut butter spreads having sliced nuts described herein therefore provide a natural mouthfeel and texture, where even though the total surface area of the nut additives (e.g., for texture) is increased as compared to a crunchy peanut butter spread, the spreadability of the peanut butter spread with sliced peanuts remains substantially the same as the nut butter base or as a creamy peanut butter having no granular additive for texture. Further, the nut butter spreads having sliced nuts described herein permit textured additives (e.g., the sliced nuts having about 20% of the sliced peanuts remain on 10 Mill Grade Mesh (e.g., mesh opening of 2032 microns), about 60% of the sliced peanuts remain on 22 TBC (Tensile Bolt Cloth) Mesh (e.g., mesh opening of 965 microns), and about 20% of the sliced peanuts fall through the 22 TBC Mesh) while maintaining processing and throughput advantages that avoid excessive fouling and/or clogging as would be attributed to roller mill grinding operations attempting to achieve the same size distribution of textured additives.

In example rheometry studies, stress overshoot tests were performed using an Anton Paar MCR 102 rheometer in the controlled rate mode with a ST22-6V fixture (6 bladed vane) and a CC27 cup. Each of the samples was stored at room temperature in original packaging. The samples were loaded into the measurement cup using spatulas and the cup was filled to the top. Lowering the fixture into the sample induced stress that was allowed to dissipate for a minimum of 3 minutes. Relaxation time began after the temperature of the cup was verified to be 70° F.+/−0.5° F. During the test, the cup temperature was maintained at 70° F.+/−0.5° F. The shear rate for the test was 7.5 l/s since such a rate corresponds to a typical spreading motion (see, e.g., Kokini et al., incorporated herein by reference). The shear stress and shear rate were measured every 0.5 seconds. The stress exceeded the equilibrium stress for 7.5 l/s shear rate at the beginning of each measurement (stress overshoot). The peak stress obtained during the first 10 seconds of the test was reported as the overshoot. The results of the stress overshoot tests are provided in FIG. 5.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A pre-packaged peanut butter spread with centrifugally-sliced peanuts, comprising:
   a peanut butter base in an amount of between 80% to about 90% by weight of the total weight of the peanut butter spread with centrifugally-sliced peanuts, the peanut butter base including
      a peanut paste in an amount of between about 86% to about 89% by weight of the peanut butter base; and
      an ingredient selected from the group consisting of sugar, shortening, salt, vegetable oil, and combinations thereof;
   a plurality of centrifugally-sliced peanuts sliced with a centrifugal slicer, blended with the peanut butter base, the plurality of centrifugally-sliced peanuts included in an amount of about 10% to about 20% by weight of the total weight of the peanut butter spread with sliced peanuts, the plurality of centrifugally-sliced peanuts having a size distribution wherein about 20% of the centrifugally-sliced peanuts remain on 10 Mill Grade Mesh, about 60% of the centrifugally-sliced peanuts remain on 22 Tensile Bolt Cloth Mesh, and about 20% of the centrifugally-sliced peanuts fall through the 22 Tensile Bolt Cloth Mesh; and
   a sealed container containing the plurality of centrifugally-sliced peanuts blended with the peanut butter base.

2. The pre-packaged peanut butter spread with centrifugally-sliced peanuts of claim 1, wherein the peanut paste includes sugar in an amount of between about 3% to about 25% by weight of the peanut butter base.

3. The pre-packaged peanut butter spread with centrifugally-sliced peanuts of claim 1, wherein the peanut paste includes shortening in an amount of between about 0.5% to about 2.5% by weight of the peanut butter base.

4. The pre-packaged peanut butter spread with centrifugally-sliced peanuts of claim 3, wherein the shortening includes a cottonseed/rapeseed shortening blend having a weight ratio from about 70 to about 50 cottonseed oil to about 30 to about 50 rapeseed oil.

5. The pre-packaged peanut butter spread with centrifugally-sliced peanuts of claim 1, wherein the peanut paste includes salt in an amount of between about 0.75% to about 1.5% by weight of the peanut butter base.

6. The pre-packaged peanut butter spread with centrifugally-sliced peanuts of claim 1, wherein the peanut paste includes vegetable oil in an amount of between about 0.5% to about 9% by weight of the peanut butter base.

7. The pre-packaged peanut butter spread with centrifugally-sliced peanuts of claim 6, wherein the vegetable oil includes one or more of coconut oil, corn oil, cottonseed oil, olive oil, palm oil, peanut oil, rapeseed oil, canola oil, safflower oil, sesame oil, soybean oil, and sunflower oil.

8. The pre-packaged peanut butter spread with centrifugally-sliced peanuts of claim 1, wherein the plurality of centrifugally-sliced peanuts is derived from at least one of split peanuts, medium peanuts, and jumbo peanuts.

9. The pre-packaged peanut butter spread with centrifugally-sliced peanuts of claim 8, the plurality of centrifugally-sliced peanuts is derived from a combination of split peanuts and medium peanuts.

10. The pre-packaged peanut butter spread with centrifugally-sliced peanuts of claim 9, wherein the combination of split peanuts and medium peanuts includes a weight ratio of split peanuts to medium peanuts from about 80 to about 20 split peanuts to about 20 to about 80 medium peanuts.

11. The pre-packaged peanut butter spread with centrifugally-sliced peanuts of claim 8, wherein the plurality of centrifugally-sliced peanuts is derived from a combination of split peanuts and jumbo peanuts.

12. The pre-packaged peanut butter spread with centrifugally-sliced peanuts of claim 11, wherein the combination of split peanuts and jumbo peanuts includes a weight ratio of split peanuts to jumbo peanuts from about 80 to about 20 split peanuts to about 20 to about 80 jumbo peanuts.

13. The pre-packaged peanut butter spread with centrifugally-sliced peanuts of claim 1, further comprising honey in an amount of about 2% to about 5% by weight of the peanut butter base.

14. The pre-packaged peanut butter spread with centrifugally-sliced peanuts of claim 1, further comprising molasses in an amount of about 0.2% to about 3% by weight of the peanut butter base.

15. The pre-packaged peanut butter spread with centrifugally-sliced peanuts of claim 1, further comprising:
   extra light amber honey in an amount of about 2% to about 5% by weight of the peanut butter base; and
   unsulphured sugarcane molasses in an amount of about 0.5% to about 1.7% by weight of the peanut butter base.

16. The pre-packaged peanut butter spread with centrifugally-sliced peanuts of claim 1, having an average peak stress overshoot that is about 50% to about 150% of an average peak stress overshoot of the peanut butter base.

17. A peanut butter spread with centrifugally-sliced peanuts, comprising:

a peanut butter base in an amount of between 75% to about 95% by weight of the total weight of the peanut butter spread with centrifugally-sliced peanuts, the peanut butter base including
  a peanut paste in an amount of between about 80% to about 94% by weight of the peanut butter base; and
  an ingredient selected from the group consisting of a sweetening agent, shortening, salt, vegetable oil, and combinations thereof; and
a plurality of centrifugally-sliced peanuts sliced with a centrifugal slicer, the plurality of centrifugally-sliced peanuts included in an amount of about 5% to about 25% by weight of the total weight of the peanut butter spread with centrifugally-sliced peanuts, the plurality of centrifugally-sliced peanuts having a size distribution wherein about 20% of the centrifugally-sliced peanuts remain on 10 Mill Grade Mesh, about 60% of the centrifugally-sliced peanuts remain on 22 Tensile Bolt Cloth Mesh, and about 20% of the centrifugally-sliced peanuts fall through the 22 Tensile Bolt Cloth Mesh; and
a sealed container containing the plurality of centrifugally-sliced peanuts and the peanut butter base.

18. The peanut butter spread with centrifugally-sliced peanuts of claim 17, wherein the peanut paste includes the sweetening agent in an amount of between about 3% to about 25% by weight of the peanut butter base.

19. The peanut butter spread with centrifugally-sliced peanuts of claim 17, wherein the peanut paste includes shortening in an amount of between about 0.5% to about 2.5% by weight of the peanut butter base.

20. The peanut butter spread with centrifugally-sliced peanuts of claim 19, wherein the shortening includes a cottonseed/rapeseed shortening blend having a weight ratio from about 70 to about 50 cottonseed oil to about 30 to about 50 rapeseed oil.

21. The peanut butter spread with centrifugally-sliced peanuts of claim 17, wherein the peanut paste includes salt in an amount of between about 0.5% to about 2.5% by weight of the peanut butter base.

22. The peanut butter spread with centrifugally-sliced peanuts of claim 17, wherein the peanut paste includes vegetable oil in an amount of between about 0.5% to about 10% by weight of the peanut butter base.

23. The peanut butter spread with centrifugally-sliced peanuts of claim 22, wherein the vegetable oil includes one or more of coconut oil, corn oil, cottonseed oil, olive oil, palm oil, peanut oil, rapeseed oil, canola oil, safflower oil, sesame oil, soybean oil, and sunflower oil.

24. The peanut butter spread with centrifugally-sliced peanuts of claim 17, wherein the plurality of centrifugally-sliced peanuts is derived from at least one of split peanuts, medium peanuts, and jumbo peanuts.

25. The peanut butter spread with centrifugally-sliced peanuts of claim 24, the plurality of centrifugally-sliced peanuts is derived from a combination of split peanuts and medium peanuts.

26. The peanut butter spread with centrifugally-sliced peanuts of claim 25, wherein the combination of split peanuts and medium peanuts includes a weight ratio of split peanuts to medium peanuts from about 80 to about 20 split peanuts to about 20 to about 80 medium peanuts.

27. The peanut butter spread with centrifugally-sliced peanuts of claim 24, wherein the plurality of centrifugally-sliced peanuts is derived from a combination of split peanuts and jumbo peanuts.

28. The peanut butter spread with centrifugally-sliced peanuts of claim 27, wherein the combination of split peanuts and jumbo peanuts includes a weight ratio of split peanuts to jumbo peanuts from about 80 to about 20 split peanuts to about 20 to about 80 jumbo peanuts.

29. The peanut butter spread with centrifugally-sliced peanuts of claim 17, further comprising honey in an amount of about 2% to about 5% by weight of the peanut butter base.

30. The peanut butter spread with centrifugally-sliced peanuts of claim 17, further comprising molasses in an amount of about 0.2% to about 3% by weight of the peanut butter base.

31. The peanut butter spread with centrifugally-sliced peanuts of claim 17, further comprising:
  extra light amber honey in an amount of about 2% to about 5% by weight of the peanut butter base; and
  unsulphured sugarcane molasses in an amount of about 0.5% to about 1.7% by weight of the peanut butter base.

32. The peanut butter spread with centrifugally-sliced peanuts of claim 17, having an average peak stress overshoot that is about 50% to about 150% of an average peak stress overshoot of the peanut butter base.

* * * * *